(12) United States Patent
Mansfield

(10) Patent No.: US 6,226,195 B1
(45) Date of Patent: May 1, 2001

(54) CIRCUITRY FOR SUPPLYING A CONTROLLED SIGNAL TO A DRIVE SYSTEM

(75) Inventor: William M. Mansfield, Lafayette, CO (US)

(73) Assignee: Micro Motion, Incorporated, Boulder, CO (US)

( * ) Notice: Subject to any disclaimer, the term of this patent is extended or adjusted under 35 U.S.C. 154(b) by 0 days.

(21) Appl. No.: 09/540,586

(22) Filed: Mar. 31, 2000

(51) Int. Cl.[7] ...................................................... H02M 3/24
(52) U.S. Cl. ................... 363/98; 363/17; 363/132
(58) Field of Search ..................... 73/861.357, 861.355; 363/17, 98, 132

(56) References Cited

U.S. PATENT DOCUMENTS 4,935,857 * 6/1990 Nguyen et al. .................... 363/17
5,790,392 * 8/1998 Eklund et al. ..................... 363/49

* cited by examiner

Primary Examiner—Shawn Riley
(74) Attorney, Agent, or Firm—Duft, Graziano & Forest, P.C.

(57) ABSTRACT

Circuitry that provides alternating current to a load from a unipolar power supply. A current source in the circuitry controls current applied to the load. A first switch and a second switch are connected between the load and the current source and allow current to flow from the current source to the load in a first direction responsive to the first switch and the second switch being closed. A third switch and a fourth switch connected between the load and the current source allow current to flow from the current source to the load in a second direction responsive to the third switch and the fourth switch being closed.

10 Claims, 3 Drawing Sheets

CIRCUITRY FOR SUPPLYING A CONTROLLED SIGNAL TO A DRIVE SYSTEM

FIELD OF THE INVENTION

This invention relates to providing a current to a load. More particularly, this invention relates to a system that changes the polarity of voltage applied to a load from a single power source. Still more particularly, this invention relates to circuitry that provides power to a drive system of a Coriolis flowmeter.

PROBLEM

Some loads require that the polarity of the voltage of current applied to the load be periodically reversed. The reversal of polarity of voltage changes the direction of current flowing through the load. This change in direction of current flow may achieve a certain function performed by a load. One example of a load requiring a change in the polarity of applied voltage is a drive system for a Coriolis flowmeter.

A Coriolis mass flowmeter measures mass flow and other information of materials flowing through a conduit in the flowmeter. Exemplary Coriolis flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith et al. These flowmeters have one or more conduits of straight or curved configuration. Each conduit configuration in a Coriolis mass flowmeter has a set of natural vibration modes, which may be of a simple bending, torsional or coupled type. Each conduit is driven to oscillate at resonance in one of these natural modes. Material flows into the flowmeter from a connected pipeline on the inlet side of the flowmeter, is directed through the conduit or conduits, and exits the flowmeter through the outlet side of the flowmeter. The natural vibration modes of the vibrating, material filled system are defined in part by the combined mass of the conduits and the material flowing within the conduits.

When there is no flow through the flowmeter, all points along the conduit oscillate due to an applied driver force with identical phase or small initial fixed phase offset which can be corrected. As material begins to flow, Coriolis forces cause each point along the conduit to have a different phase. The phase on the inlet side of the conduit lags the driver, while the phase on the outlet side of the conduit leads the driver. Pick-off sensors on the conduit(s) produce sinusoidal signals representative of the motion of the conduit(s). Signals output from the pick-off sensors are processed to determine the phase difference between the pick-off sensors. The phase difference between two pick-off sensor signals is proportional to the mass flow rate of material through the conduit(s).

The drive system of a Coriolis flowmeter is affixed to the conduit(s) and oscillates the conduit(s) in response to a signal from driver control circuitry. A conventional driver for a Coriolis flow meter has a magnet mounted in opposition to a coil. The driver control circuitry applies an electric current or drive signal to the coil of the driver. The current flowing through the coil generates electromagnetic forces between the coil and the magnet. The coil is alternately attracted and repelled by the magnet. The attraction and repulsion causes the flow tubes to vibrate.

In order to alternately attract and repel the magnet, the polarity of the voltage of current flowing through the driver is reversed. This allows the driver to apply force to the conduit(s) through both halves of a cycle of oscillation.

It is a problem that two separate supply rails to the driver control circuitry are required to reverse the polarity of voltage with respect to ground. This increases the complexity and the cost of manufacture of the drive control circuitry.

A second problem particular to the drive system of a Coriolis flowmeter is that the output voltage of the power supply is controlled. However, the conversion of electrical energy to kinetic energy or force applied to the conduit(s) is dependent upon current as shown by Faraday's law. The relationship between applied voltage and force imparted on the conduit is indirect. Therefore, the current may not be in phase with the motion of the conduits when voltage is controlled. This reduces the efficiency of power conversion to force for vibrating the conduit(s).

A third problem that is also particular to a drive system of a Coriolis flowmeter is maintaining intrinsic safety of the drive circuit while maximizing power transfer. Intrinsic safety requirements place a limit on the maximum instantaneous voltage and current applied to a load, such as the driver system. However, mechanical motion of the conduit(s) is dependent upon average voltage and current applied to the driver system. Therefore, the drive signal must minimize the difference between peak values and averages values to maximize the efficiency of the drive system.

SOLUTION

The above and other problems are solved and an advance in the art is made by circuitry for supplying a controlled square wave to a drive system of this invention. The circuitry of this invention allows a single power supply to supply voltage of alternating polarity to a load. This reduces the cost and complexity of the circuitry. This circuitry also allows the amount of current applied to a load to be controlled instead of the amount of voltage. The circuitry of this invention also provides current in the form of a square wave which maximizes the average voltage and current applied to the load by minimizing the difference between peak and average volumes for the voltage and current.

The circuitry of this invention includes an H-bridge. H-bridges are used commonly in fixed amplitude applications to reverse polarity of voltage through a load. An H-bridge has two sets of switches connected to terminals connecting the load to the circuit. The sets of switches are alternatively opened and closed to reverse the flow of current to the load. When a first and second switch of the first set of switches are closed, current flows in a first direction over the h-bridge and through the load. When a second and a third switch of the second set of switches is closed, current flows over the h-bridge and through the load in a second direction that is opposite of the first direction.

In order to adjust the amplitude of current applied to the load, the h-bridge is connected to a power source that can adjust the amplitude of current applied to the h-bridge and delivered to the load.

An aspect of this invention is circuitry that provides alternating current to a load from a unipolar power supply in the following manner. A current source controls the amplitude of current applied to the load. A first switch and a second switch are connected between the load and the current source and allow current to flow from the current source to the load in first direction responsive to the first switch and the second switch being closed. A third switch and a fourth switch are also connected between the load and the current source and allow current to flow from the current source to the load in a second direction responsive to the third switch and the fourth switch being closed.

Another aspect of this invention is control circuitry that opens and closes the first switch, the second switch, the third switch, and the fourth switch to change direction of the flow of current between the first and the second direction.

Another aspect of this invention is that the control circuitry comprises a comparator that receives a feedback signal from the load and determines which switches to close.

Another aspect of this invention is that the comparator is a zero crossing comparator.

Another aspect of this invention is that amplitude control circuitry adjusts the amplitude of the current applied to the load.

Another aspect of this invention is circuitry for providing a drive signal to a drive system that vibrates at least one conduit in a Coriolis flowmeter having the following components. A current source that controls current applied to the load. A first switch and a second switch connected between the drive system and the current source and that allow current to flow from the current source to the drive system in a first direction responsive to the first switch and the second switch being closed. A third switch and a fourth switch connected between the drive system and the current source and allow current to flow from the current source to the drive system in a second direction responsive to the third switch and the fourth switch being closed.

Another aspect of this invention is control circuitry that opens and closes the first switch, the second switch, the third switch, and the fourth switch to change direction of said flow of current between the first direction and the second direction.

Another aspect of this invention is that the control circuitry comprises a comparator that receives a feedback signal from pick-off sensors connected to said at least one conduit and determines which of the switches to close responsive to said feedback signal.

Another aspect of this invention is that the comparator is a zero crossing comparator.

Another aspect of this invention is that amplitude control circuitry in the power source controls the amplitude of said current applied to said drive system.

DESCRIPTION OF THE DRAWINGS

The above and other features of this invention can be seen from the detailed description and the following drawings.

DETAILED DESCRIPTION

Figure 1:
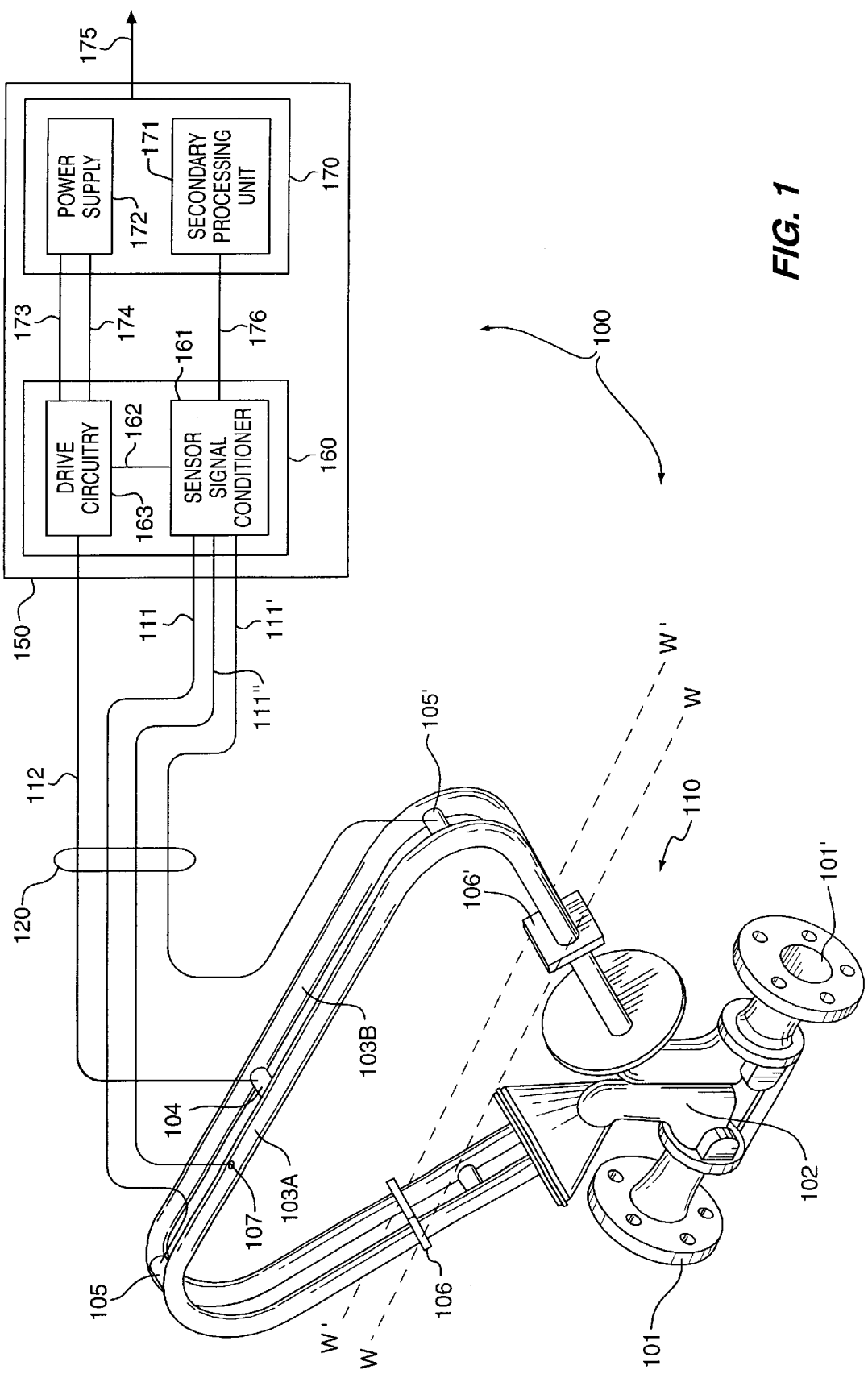
FIG. 1 illustrating a Coriolis flowmeter having drive circuitry that includes circuitry in accordance with the present invention.

This invention relates to providing an alternating controlled square wave from a power source to a load. FIG. 1 illustrates a Coriolis flowmeter having a drive circuit that incorporates circuitry that operates in accordance with the present invention. Coriolis flowmeter 100 includes a flowmeter assembly 110 and meter electronics 150. Meter electronics 150 are connected to a meter assembly 110 via leads 120 to provide for example, but not limited to, density, mass-flow-rate, volume-flow-rate, and totalized mass-flow rate information over a path 175. A Coriolis flowmeter structure is described although it should be apparent to those skilled in the art that the present invention could be practiced in conjunction with any apparatus having loads requiring currents of alternating voltage.

A Coriolis flowmeter structure is described although it should be apparent to those skilled in the art that the present invention could be practiced in conjunction with any apparatus having a vibrating conduit to measure properties of material flowing through the conduit. A second example of such an apparatus is a vibrating tube densitometer which does not have the additional measurement capability provided by a Coriolis mass flowmeters.

Meter assembly 110 includes a pair of flanges 101 and 101', manifold 102 and conduits 103A and 103B. Driver 104, pick-off sensors 105 and 105', and temperature sensor 107 are connected to conduits 103A and 103B. Brace bars 105 and 105' serve to define the axis W and W' about which each conduit oscillates.

When Coriolis flowmeter 100 is inserted into a pipeline system (not shown) which carries the process material that is being measured, material enters flowmeter assembly 110 through flange 101, passes through manifold 102 where the material is directed to enter conduits 103A and 103B. The material then flows through conduits 103A and 103B and back into manifold 102 from where it exits meter assembly 110 through flange 101'.

Conduits 103A and 103B are selected and appropriately mounted to the manifold 102 so as to have substantially the same mass distribution, moments of inertia and elastic modules about bending axes W—W and W'—W', respectively. The conduits 103A–103B extend outwardly from the manifold in an essentially parallel fashion.

Conduits 103A–103B are driven by driver 104 in opposite directions about their respective bending axes W and W' and at what is termed the first out of phase bending mode of the flowmeter. Driver 104 may comprise any one of many well known arrangements, such as a magnet mounted to conduit 103A and an opposing coil mounted to conduit 103B and through which an alternating current is passed for vibrating both conduits. A suitable drive signal is applied by meter electronics 150 to driver 104 via path 112.

Pick-off sensors 105 and 105' are affixed to at least one of conduits 103A and 103B on opposing ends of the conduit to measure oscillation of the conduits. As the conduit 103A–103B vibrates, pick-off sensors 105-105' generate a first pick-off signal and a second pick-off signal. The first and second pick-off signals are applied to paths 111 and 111'. The driver velocity signal is applied to path 112.

Temperature sensor 107 is affixed to at least one conduit 103A and/or 103B. Temperature sensor 107 measures the temperature of the conduit in order to modify equations for the temperature of the system. Path 111" carries temperature signals from temperature sensor 107 to meter electronics 150.

Meter electronics 150 receives the first and second pick-off signals appearing on paths 111 and 111', respectively. Meter electronics 150 processes the first and second velocity signals to compute the mass flow rate, the density, or other property of the material passing through flowmeter assembly 10. This computed information is applied by meter electronics 150 over path 175 to a utilization means (not shown). It is known to those skilled in the art that Coriolis flowmeter 100 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only a single feedback signal since a density measurement requires only the measurement of frequency and a phase measurement is not necessary. The descriptions of the present invention herein apply equally to vibrating tube densitometers.

In Coriolis flowmeter 100, the meter electronics 150 are physically divided into 2 components a host system 170 and a signal conditioner 160. In conventional meter electronics, these components are housed in one unit.

Signal conditioner 160 includes drive circuitry 163 and pick-off conditioning circuitry 161. One skilled in the art will recognize that in actuality drive circuitry 163 and pick-off conditioning circuitry 161 may be separate analog circuits or may be separate functions provided by a digital signal processor or other digital components. Drive circuitry 163 generates a drive signal and applies an alternating drive current to driver 104 via path 112 of path 120. The circuitry of the present invention may be included in drive circuitry 163 to provide an alternating current to driver 104.

In actuality, path 112 is a first and a second lead. Drive circuitry 163 is communicatively connected to pick-off signal conditioning circuitry 161 via path 162. Path 162 allows drive circuitry to monitor the incoming pick-off signals to adjust the drive signal. Power to operate drive circuitry 163 and pick-off signal conditioning circuitry 161 is supplied from host system 170 via a first wire 173 and a second wire 174. First wire 173 and second wire 174 may be a part of a conventional 2-wire, 4-wire cable, or a portion of a multi-pair cable.

Pick-off signal conditioning circuitry 161 receives input signals from first pick-off 105, second pick-off 105', and temperature sensor 107 via paths 111, 111' and 111". Pick-off circuitry 161 determines the frequency of the pick-off signals and may also determine properties of a material flowing through conduits 103A–103B. After the frequency of the input signals from pick-off sensors 105-105' and properties of the material are determined, parameter signals carrying this information are generated and transmitted to a secondary processing unit 171 in host system 170 via path 176. In a preferred embodiment, path 176 includes 2 leads. However, one skilled in the art will recognize that path 176 may be carried over first wire 173 and second wire 174 or over any other number of wires.

Host system 170 includes a power supply 172 and processing system 171. Power supply 172 receives electricity from a source and converts the received electricity to the proper power needed by the system. Processing system 171 receives the parameter signals from pick-off signal conditioning circuitry 161 and then may perform processes needed to provide properties of the material flowing through conduits 103A–103B needed by a user. Such properties may include but are not limited to density, mass flow rate, and volumetric flow rate.

Figure 2:
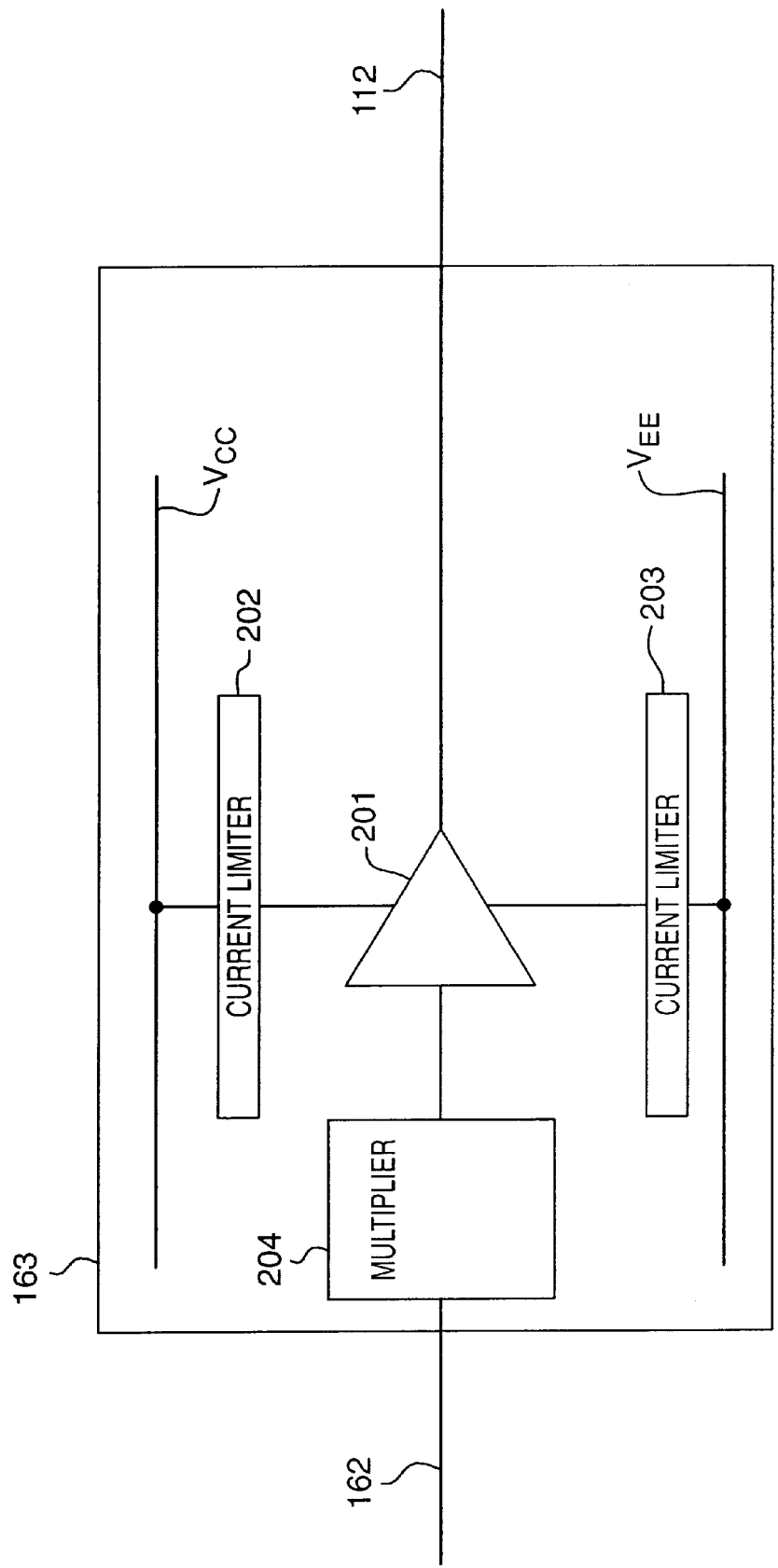
FIG. 2 illustrating a prior art circuit for supplying a controlled square wave to a load.

FIG. 2 illustrates a prior implementation of drive circuitry 163 including a prior art system for applying an alternating current to a load which is driver 104. A sinusoidal signal is received by multiplier 204 from sensors 105-105' (FIG. 1) via path 162. The multiplier adjusts the drive amplitude. The adjusted signal from multiplier 204 is applied to amplifier 201. Amplifier 201 boosts the sinusoidal signal to a proper level to cause driver 104 (FIG. 1) to oscillate. A supply voltage is applied to amplifier 201 from current limiter 202 or 203. Current limiters 202 and 203 assure against excessively low impedance in a load such as driver 104 (FIG. 1).

The polarity of the applied voltage is periodically reversed with respect to ground which is connected to driver 104. The reversal of polarity allows driver 104 (FIG. 1) to impart energy to flow tubes 103A and 103B during both halves of each cycle of oscillation. The reversal of voltage polarity requires to separate supply rails Vcc and Vee. Supply rails Vcc and Vee have opposite voltage polarities.

The use of separate supply rails Vcc and Vee increase complexity of the circuit and increases power consumption. Power consumption is increased because simple amplifiers 201 typically used in drive circuit 162 drive an out close but not equal to a supply rail. This requires additional voltage overhead to provide a certain voltage to driver 104 (FIG. 1).

A second problem is that output voltage of drive circuit 162 is controlled. However, the conversion of electrical energy to kinetic energy in driver 104 is dependent upon current according to Faraday's law. Even though applied voltage results in applied current, the relation between force applied and voltage applied is indirect and is dependent upon other factors. For example, the inductance of the coil and motion of conduits 103A and 103B effect the applied force applied. Therefore, it is desirable to control current rather than voltage.

Another problem with drive circuit 163 shown in FIG. 2 is the ability to maximize power delivered to driver 104 while constrained by intrinsic safety standards. Intrinsic safety standards are set by various regulating agencies to assure that a spark or heat from a circuit does not ignite volatile material in an environment. Intrinsic safety standards place limits on the maximum instantaneous voltage and current that may be delivered to a load such as driver 104 (FIG. 1). However, the force applied to conduits 103A and 103B is dependent upon the average value of current applied. Thus, maximum efficiency is achieved by minimizing the difference between average current levels and a peak current level. Since driver 104 (FIG. 1) utilizes sinusoidal current and the electro-mechanical force generated is also a sinusoidal. The product of sinusoidal current and the electro-mechanical force generated is also a sinusoidal and is the useful power of the system. Since a square current multiplied by a sinusoidal voltage produces more average power than the product of two sinusoids, a square wave current will allow lower peak values of current for the same average power.

Figure 3:
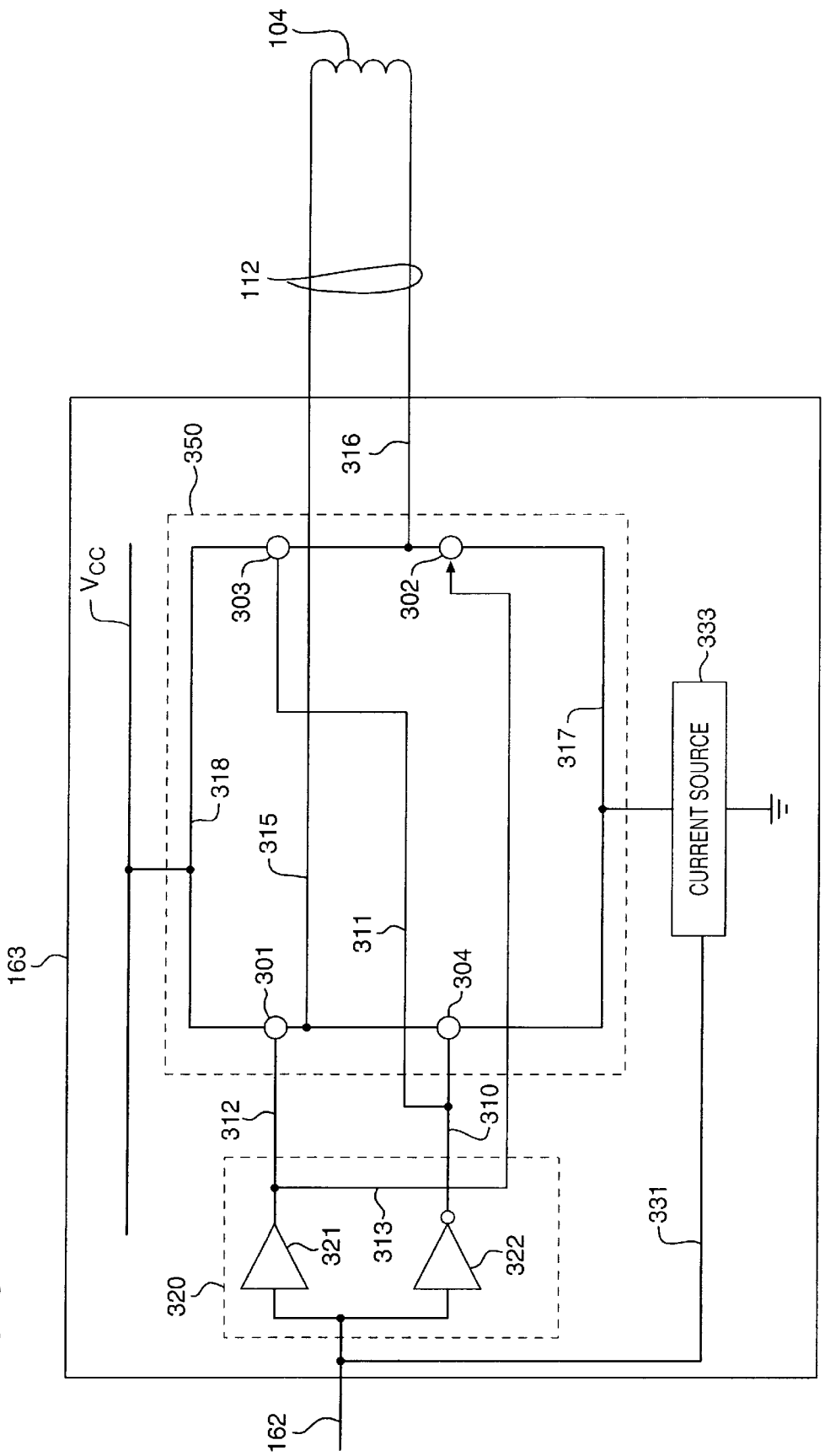
FIG. 3 illustrating a circuit for supplying a controlled square wave to a load in accordance with this invention.

FIG. 3 illustrates a drive circuit 163 that provides a constant square wave alternating current using a single power supply. In drive circuit 163 there is a single current source 333. The polarity of voltage applied to a load, such as driver 104 (FIG. 1), is determined by two sets of switches in H-bridge circuit 350. When a first set of switches including switch 301 and 302 are closed current flows in a first direction to driver 104 (FIG. 1). When the first set of switches is open and a second set of switches switch 303 and 304, is closed, voltage is applied to driver 104 in a second opposite direction.

When switches 301 and 302 are closed and switches 303 and 304 are open, current flows through driver 104 in the following manner. Supply rail Vcc applies current over path 314 to closed switch 301 and open switch 303. Current flows through switch 301 to path 315 and to driver 104 via path 315. Current then is flows to the driver and returns via path 316. The current flows through closed switch 302 and over path 317 to current source 333. Current source 333 is connected to ground.

When switches 303 and 304 are closed and switches 302 and 301 are open, current flows to driver 104 in the following manner. Supply rail Vcc applies current over path 314 to switch 303. Current flows through switch 303 and is applied via path 316 to driver 104. Current returns via path 315 and flows through closed switch 304 to path 317. This is a direction that is opposite of the path provided by switches 301 and 302. Control circuitry 320 opens and closes switches 301–304 to change the polarity of voltage applied to driver 104. A feedback signal is received by control circuitry 320 via path 162. From the feedback signal, the control circuitry changes the direction of flow. In a preferred embodiment, control circuitry 320 includes a zero comparator. Zero comparator includes a delay 321 and an invertor 322 that receive signals and alternately apply opposite signals to switches 301–304 to open and close the switches. Delay 321 applies signals to switches 301 and 302 via paths 312 and 313. Invertor 322 applies signals to switches 303 and 304 via paths 310 and 311.

Switches 301–304 are set for a constant impedance since changing the impedance of switches dynamically is difficult. Amplitude is controlled in well known and conventional manners in current source 333 which receives an amplitude signal from path 163 via path 331. This works because H-bridge 350 is essentially part of the load connected to the current source. Since switches 301–304 are either completely opened or completely closed, the output appears as a square waveform.

The above is a description of a preferred of circuitry for supplying a controlled square wave to a load. It is expected that those skilled in the art can and will design alternative circuits that infringe this invention as set forth in the claims below literally or through the Doctrine of Equivalents.

What is claimed is:

1. Circuitry that provides alternating current to a load from a unipolar power supply comprising:
   a current source that controls alternating current applied to said load;
   a first switch and a second switch connected between said load and said current source and that allow said alternating current to flow from said current source to said load in first direction responsive to said first switch and said second switch being closed; and
   a third switch and a fourth switch connected between said load and said current source and that allow said alternating current to flow from said current source to said load in a second direction responsive to said third switch and said fourth switch being closed.

2. The circuitry of claim 1 further comprising:
   control circuitry that opens and closes said first switch, said second switch, said third switch, and said fourth switch to change direction of said flow of said alternating current between said first and said second direction.

3. The circuitry of claim 2 wherein said control circuitry comprises:
   a comparator that receives a feedback signal from said load and determines which of said switches to close.

4. The circuitry of claim 3 wherein said comparator is a zero crossing comparator.

5. The circuitry of claim 1 further comprising:
   amplitude control circuitry that adjusts the amplitude of said alternating current applied to said load.

6. Circuitry for providing a drive signal to a drive system that vibrates at least one conduit in a Coriolis flowmeter, said circuitry comprising:
   a current source that controls current applied to said load;
   a first switch and a second switch connected between said drive system and said current source and that allow current to flow from said current source to said drive system in a first direction responsive to said first switch and said second switch being closed;
   a third switch and a fourth switch connected between said drive and said current source and that allow current to flow from said current source to said drive system in a second direction responsive to said third switch and said fourth switch being closed.

7. The circuitry of claim 6 further comprising:
   control circuitry that opens and closes said first switch, said second switch, said third switch, and said fourth switch to change direction of said flow of current between said first direction and said second direction.

8. The circuitry of claim 7 wherein said control circuitry comprises:
   a comparator that receives a feedback signal from pick-off sensors connected to said flow tube and determines which of said switches to close responsive to said feedback signal.

9. The circuitry of claim 8 wherein said comparator is a zero crossing comparator.

10. The circuitry of claim 9 further comprising:
    amplitude control circuitry that controls the amplitude of said current applied to said drive system.

* * * * *

UNITED STATES PATENT AND TRADEMARK OFFICE
CERTIFICATE OF CORRECTION

PATENT NO. : 6,226,195 B1   Page 1 of 1
DATED : May 1, 2001
INVENTOR(S) : William M. Mansfield It is certified that error appears in the above-identified patent and that said Letters Patent is hereby corrected as shown below:

<u>Title page,</u>
Item 73 Assignee replace "Micro Motion, Incorporated, Boulder, CO (US)"
with -- Micro Motion, Inc., Boulder, CO (US) --

<u>Column 6,</u>
Line 60, replace "315. Current then is flows to the driver and returns via path"
with -- 315. Current then flows to the driver and returns via path --

Signed and Sealed this

Eighteenth Day of September, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,226,195 B1
DATED : May 1, 2001
INVENTOR(S) : William M. Mansfield It is certified that error appears in the above-identified patent and that said Letters Patent is hereby corrected as shown below:

<u>Title page,</u>
Item [73], Assignee, replace "Micro Motion, Incorporated, Boulder, CO (US)" with -- Micro Motion, Inc., Boulder, CO (US) --.

Signed and Sealed this

Twelfth Day of February, 2002

Attest:

Attesting Officer

JAMES E. ROGAN
*Director of the United States Patent and Trademark Office*